(No Model.)
W. E. LINCOLN.
CREAMING CAN.
No. 306,935. Patented Oct. 21, 1884.
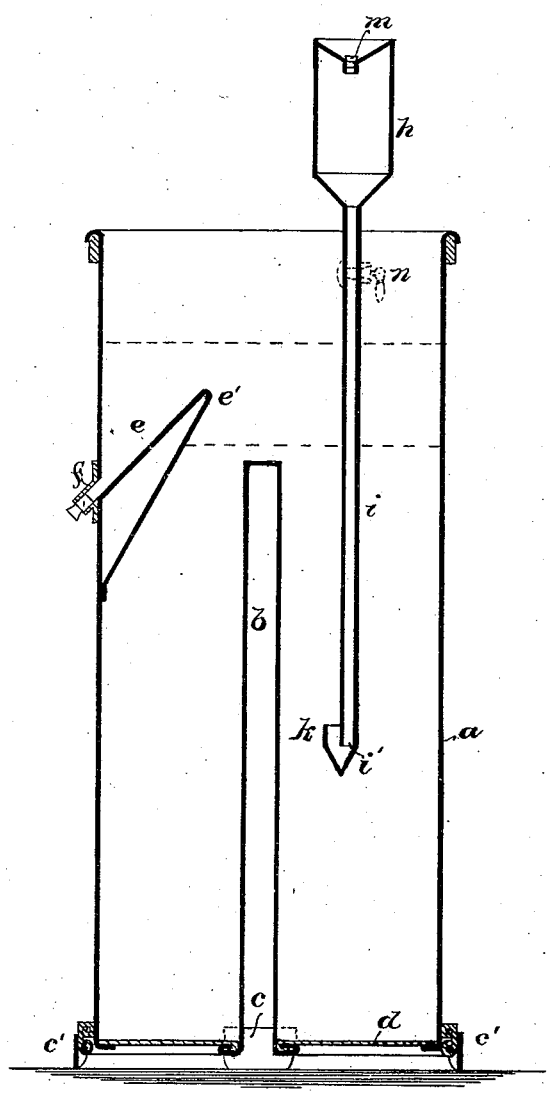
Witnesses
Henry Marsh
B. T. Noyes.
Inventor
William E. Lincoln
by Crosby & Gregory attys.

UNITED STATES PATENT OFFICE.

WILLIAM E. LINCOLN, OF WARREN, MASSACHUSETTS.

CREAMING-CAN.

SPECIFICATION forming part of Letters Patent No. 306,935, dated October 21, 1884.

Application filed February 29, 1884. (No model.)

*To all whom it may concern:*

Be it known that I, WILLIAM E. LINCOLN, of Warren, county of Worcester, State of Massachusetts, have invented an Improvement in Creaming-Cans, of which the following description, in connection with the accompanying drawing, is a specification, like letters on the drawing representing like parts.

My invention, relating to apparatus for separating cream from milk, or causing the cream to rise by exposure to a low temperature, is embodied in a deep cylindrical can having its lower portion separated by a channel into two parts, so that nearly double the surface is exposed to the influences of the surrounding cooling-liquid in which the can is immersed, while a single space is afforded in the top of the can for the cream. In order to strengthen the can in a simple and effective manner the lower end is provided with metal lugs, preferably malleable-iron castings, two of which are united with the two portions of the bottom of the can, and span the channel or open space, thereby giving the can equal strength to one made with an unbroken circular bottom. Other similar lugs are attached around the lower edges of the can, projecting below its bottom, the several lugs constituting feet to support the can and protect its bottom from the floor, so that the cans are far more durable than ordinary cylindrical cans, and a free circulation of the cooling agent is permitted around and beneath them. The can is provided at its side with an inclined shelf, the edge of which is about at the level of the line of separation between the cream and milk, and adjacent to the said shelf is an orifice through which the cream may be drawn off after the separation has taken place, the shelf assisting in insuring a close line of demarkation between the cream and milk when the former is being drawn off.

The invention consists, further, in a novel device for introducing skim-milk into the can below the cream, in order to raise the level without disturbing it, as may be necessary when the line of demarkation between the cream and milk falls considerably below the separating-shelf.

The drawing shows in vertical section a creaming apparatus embodying this invention.

The can $a$, of the usual cylindrical shape and dimensions for setting milk to raise cream commonly adopted in cans, is provided with a channel, $b$, dividing its lower portion into two parts, so that when set in cold water or other cooling material the said material can circulate freely through the channel, thus cooling the milk in the lower portion of the can much more rapidly than when only its outer surface is exposed to the cooling material. In order properly to brace the lower part of the can when thus separated by a channel, so as to make a strong and durable can, it is provided with lugs $c$, of strong material, preferably malleable iron, securely fastened to the corners of the two portions of the can and spanning the channel, the said lugs projecting below the bottom sheet, $d$, of the can.

The lugs $c$, besides bracing the separated portions of the can, serve, in connection with other similar lugs, $c'$, as feet to support the can, and prevent the bottom sheet, $d$, from being worn by contact with the floor.

The can $a$ is provided with an inclined shelf, $e$, the upper edge, $e'$, of which is rounded or made by a crease in the tin of which the shelf is composed, and is placed at about the depth where the line of separation between cream and skim-milk exists after the separation has taken place.

A discharge-passage, $f$, is provided through the side of the can above the shelf $e$, and the said passage has a suitable stopper or cock for controlling the flow of the liquid through it. After the can with its contents has been placed in the cooling-fluid, so that the cream has separated from the milk and risen to the top of the can, where it occupies the entire space above the channel $b$, the discharge-passage $f$ is opened, and the cream above it drawn off, and if it is found that the cream extends a little below the edge $e'$ of the shelf the can may be slightly tilted to run off the remainder of the cream, the said edge or shelf causing the cream to flow in a thin sheet, so that it can be more thoroughly and completely separated from the milk than if flowing directly through a discharge-passage like the one, $f$, in the side of the can.

If the line between milk and cream is considerably below the edge $e'$ of the shelf, it may be desirable to raise the cream bodily above the top of the milk by introducing more milk or other liquid below the cream, which may be done by the displacing apparatus, consisting of a receptacle, $h$, having a large discharge-tube, $i$, preferably provided at its lower end with a cup-like shield, $k$, surrounding its orifice $i'$.

The vessel $h$ is adapted to be tightly closed by a stopper or equivalent, $m$, so that the liquid will be retained in it by atmospheric pressure, the shield $k$ holding sufficient liquid to seal the orifice $i'$, so as to prevent air from entering to destroy the vacuum.

The shield $k$ is preferably pointed at its lower end, so as to pass through the body of the cream at the top of the milk with as little disturbance as possible, and when the tube $i$ is passed down through the cream, as shown in the drawing, the stopper $m$ may be removed, permitting air to enter, so that the liquid can descend from the receptacle $h$ into the body of milk below the cream, causing the latter to rise, and when it is raised a sufficient distance to enable it to be discharged over the edge of the shelf $e$ the stopper $m$ will again be inserted and further flow from the receptacle $h$ is thus prevented.

If desired, a cock or equivalent may be used in the pipe $i$, as shown in dotted lines at $n$, to control the flow of the liquid for the receptacle $h$.

I am aware that a creaming-can prior to this invention has been made with a dividing channel; but its base-rim was solid and afforded no circulation. I am also aware that a bake-pan or steaming-dish has had a central heat-chamber and feet to lift up its bottom to admit circulation beneath. I am also aware that a similar construction has been applied to milk-pans; but in order to provide a circulation under the channeled creaming-vessel heretofore patented to me, I find the feet must span the channel in order to prevent the vessel from spreading apart. I am also aware that it is not broadly original with me to place an inclined cream-separating shelf in a creamer with an outlet, such shelf being a truncated cone extending entirely across the can. My invention in these particulars resides solely in the details of construction now about to be claimed.

I claim—

1. The herein-described apparatus for creaming milk, comprising the vessel $a$, having the channel $b$, the lugs or feet $c$, spanning the channel at opposite sides of the bottom of the can to securely hold together the two parts of the vessel separated by said channel and prevent them from spreading apart, and the lugs or feet $c'$, affixed to the bottom of the can, as shown.

2. The apparatus for creaming milk, comprising the inclined shelf $e$ at one side of the apparatus, having the rounded edge $e'$ and the stoppered outlet $f$, substantially as shown and described.

3. The displacing device consisting of the stoppered vessel $h$, tube $i$, and shield $k$, constructed and arranged to operate substantially as shown and described.

In testimony whereof I have signed my name to this specification in the presence of two subscribing witnesses.

WILLIAM E. LINCOLN.

Witnesses:
B. J. NOYES,
W. H. SIGSTON.